United States Patent [19]
Buckner

[11] 3,965,926
[45] June 29, 1976

[54] FLAPPER VALVE WITH INDEPENDENT PLATE SUSPENSION

[75] Inventor: Spencer P. Buckner, Houston, Tex.
[73] Assignee: TRW Inc., Cleveland, Ohio
[22] Filed: Aug. 25, 1975
[21] Appl. No.: 607,338

[52] U.S. Cl. ............................................. 137/512.1
[51] Int. Cl.² ......................................... F16K 15/03
[58] Field of Search............ 137/512, 512.1, 512.15, 137/521, 527; 98/41 R, 106, 107, 110–113

[56] References Cited
UNITED STATES PATENTS

| | | | |
|---|---|---|---|
| 3,374,804 | 3/1968 | Stegerud | 137/512.1 |
| 3,678,958 | 7/1972 | Satterwhite | 137/512.1 |

Primary Examiner—Robert G. Nilson

[57] ABSTRACT

An improvement in multi-flapper check valves wherein each closure plate or "flapper" and its hinges are supported separately, the hinges of the plates thereby not contacting or supporting each other, thus reducing the frictional load to be overcome in closing the plates.

4 Claims, 6 Drawing Figures

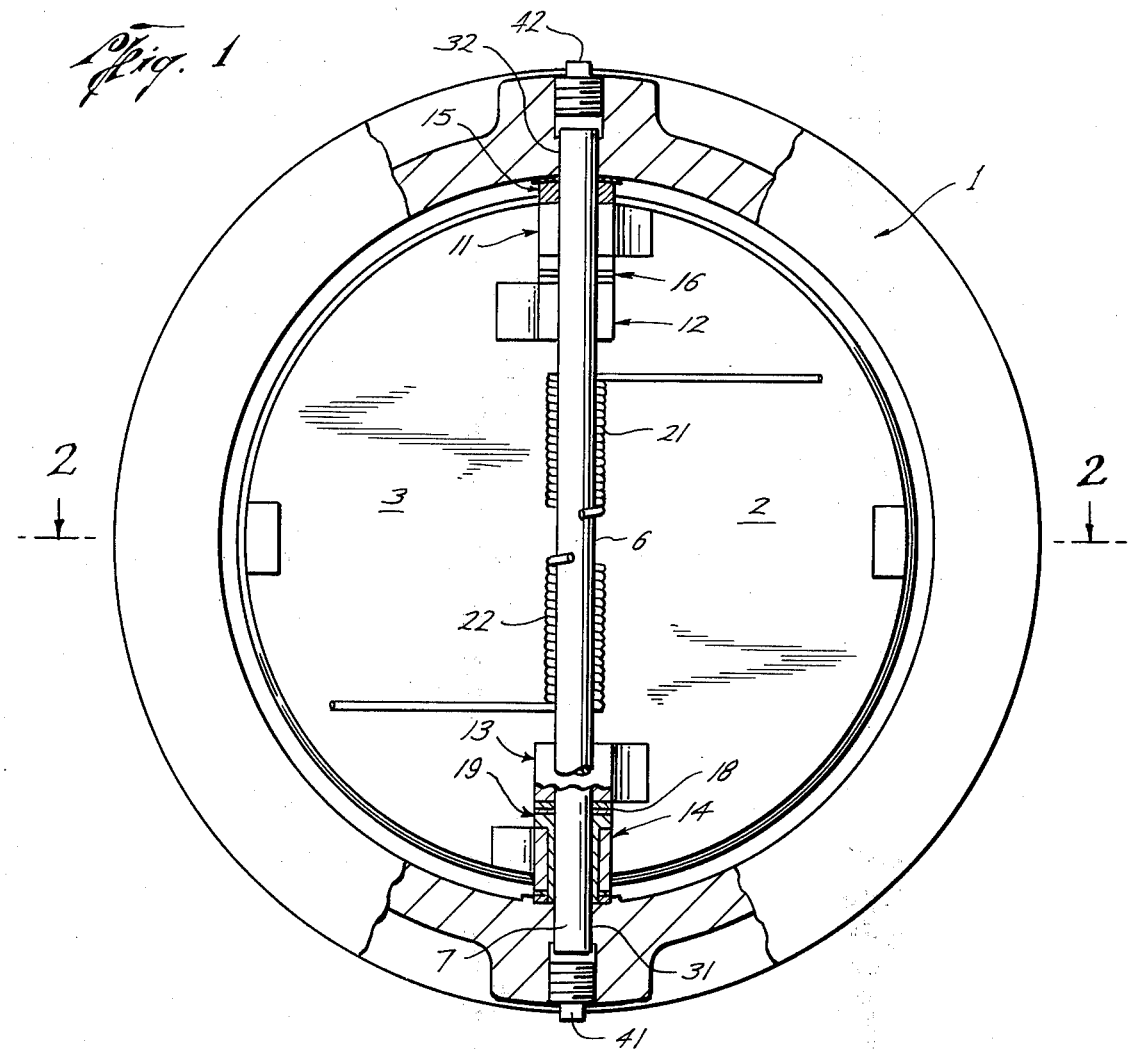
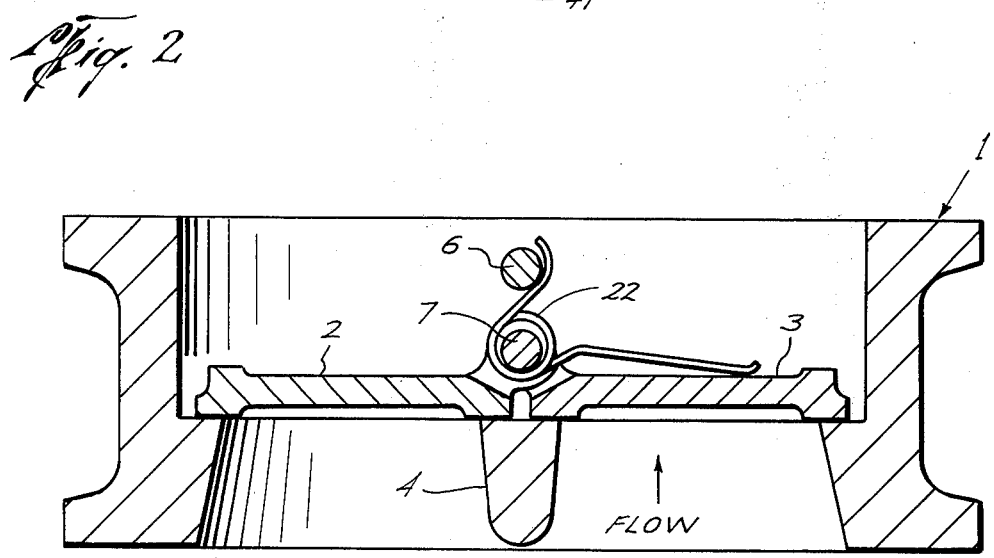

FLAPPER VALVE WITH INDEPENDENT PLATE SUSPENSION

BACKGROUND OF THE INVENTION

This invention relates to a new and useful improvement in multi-flapper check valves.

In flapper valves of the design disclosed in WBrovo, U.S. Pat. No. 1,238,878 (1917), and improved upon by wheeler in U.S. Pat. Nos. 3,007,488 (1961), 3,026,901 (1962), 3,072,141 (1963), and 3,074,427 (1963), the plate bearings or hinges contact; and, when the valve is oriented for horizontal flow conditions with the rib in a vertical position, the hinge or hinges of one plate (the "upper" plate) rest on the hinge or hinges of the other plate (the "lower" plate). This additional loading of the hinge of the lower plate increases the frictional force to be overcome in closing the lower plate. This results in a disparity between the forces necessary to close the upper plate and the lower plate, with the lower plate requiring significantly more force to effect closure. Particularly in larger valves of this design, the frictional forces can become so great as to cause the lower plate to stop or hesitate before closing, thereby impairing valve response and resulting in pressure surges upon closure.

This problem can be avoided by mounting the hinges for the upper plate and the lower plate on separate shafts, as was done in Smith, U.S. Pat. No. 3,384,112 (1968). However, the problem is solved by the present invention, which still permits the use of a single hinge pin for both upper and lower plates, rather than separate hinge pins for each of the two plates.

To improve the response time of the check valve, it is desirable to reduce the frictional loading of the lower plate hinge, thereby reducing the amount of force necessary to close the lower plate. A reduction in the frictional forces acting on the lower plate will allow the plate to close more quickly, thus improving the valve response and reducing the pressure surges and "hammer" associated with poor valve response. The addition of bearings or washers between the hinges may reduce the effective coefficient of friction, and thereby reduce the amount of force necessary to operate the lower plate. However, the additional loading of the hinge of the lower plate will still impair the operation of the lower plate.

Accordingly, it is an object of the present invention to provide a multi-flapper check valve wherein each plate is independently supported.

Another object of this invention is to provide a multi-flapper check valve with improved valve response.

A further object of this invention is to provide a multi-flapper check valve wherein the force necessary to close the lower plate is reduced.

Other objects and purposes of this invention will appear from the following descriptions, examples, and claims.

BRIEF DESCRIPTION OF THE DRAWINGS

FIG. 1 shows the check valve assembly viewed from the downstream side.

FIG. 2 is an axial section of the check valve assembly taken along line 2—2 of FIG. 1.

SUMMARY OF THE INVENTION

Figure 3:
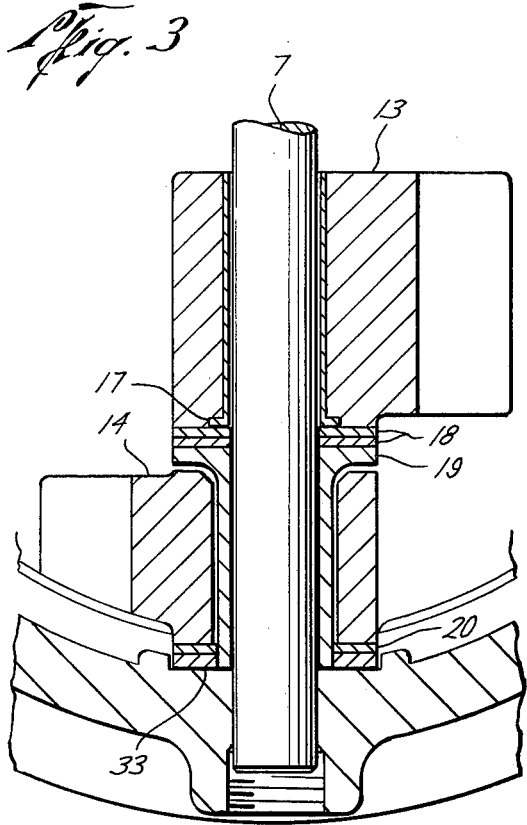
FIG. 3 is a detail drawing of the independent plate suspension shown in FIG. 1.

In this novel improvement is multi-flapper check valves, each plate is separately supported such that the hinges of the plates do not contact and, more importantly, do not rest upon each other. This is to prevent the weight of the upper plate from interfering with the operation of the lower plate, thereby reducing the frictional loading of the lower plate. Instead of allowing the lower hinge to support the hinge above it and the weight of the plate associated with the upper hinge, a support sleeve is inserted through the lower hinge, thereby providing a support surface for the upper hinge. Alternatively, a support collar or bracket may be anchored to provide such a support surface. With the upper hinge thus supported, the frictional forces acting upon the lower hinge are reduced, allowing the plate associated with the lower hinge to be operated more easily.

The freer operation of the plate associated with the lower hinge results in improved valve response, which reduces or eliminates hammer.

DESCRIPTION OF THE PREFERRED EMBODIMENTS

The basic elements of this novel check valve are shown in FIGS. 1 and 2. A semicircular right flapper 2 and a semicicular left flapper 3 lie on the body 1 with their straight edges lying along center rib 4 of the body 1. As shown, the right flapper 2 is the upper plate, and the left flapper 3 is the lower plate. The hinge pin 7 is inserted through hinge pin holes 31, in the body 1, running through the top of a body lug bearing 15, top right hinge lug 11, top plate lug bearing 16, top left hinge lug 12, spring 21, spring 22, lug sleeve 17 in bottom right hinge lug 13, bottom plate lug bearings 18, independent support sleeve 19 in bottom left hinge lug 14, and bottom body lug bearings 20 in body recess 33. Two hinge pin retainers 41 are inserted into holes 31 to hold the hinge pin in place. The stop pin 6 is inserted through stop pin holes 32 in the body 1, running through the hooked legs of springs 21 and 22. Two stop pin retainers 42 hold the stop pin 6 in place.

Lug sleeve 17 may be made of a different material from the hinge lugs, thereby providing a better surface to contact hinge pin 7 and reduce the friction acting around the hinge as the plate pivots about the hinge pin 7. Additionally, any of the bearings or sleves described herein may be made of suitable materials or given appropriate coatings to reduce friction. Furthermore, multiple or "stacked" bearings may be utilized to further reduce frictions.

Bottom left hinge lug 14, resting upon bottom body bearings 20, does not support bottom right hinge lug 13, thereby reducing the effective weight (and frictional force) acting on the lower surface of bottom left hinge 14. Additionally, since bottom right hinge lug 13 no longer rests on bottom left hinge lug 14, the frictional force acting upon the upper surface of bottom left hinge lug 14 is eliminated. Bottom right hinge lug 13 is now supported by bearings 18 resting upon independent support sleeve 19.

Ordinarily, since the inner surface of the body 1 is circular, the surface upon which independent support sleeve 19 would rest would be slightly curved. To provide a flat surface for independent support sleeve 19 to rest upon, the body 1 may be spot-surfaced and machined to form a recess 33 as shown in FIG. 3. The bottom of recess 33 will then provide a flat surface. Alternatively, a bearing with curved or beveled lower surface and a flat upper surface will provide a flat support surface.

The independent support sleeve 19 should be designed such that it is of adequate wall thickness to support the weight of the upper plate without buckling or collapse. However, the wall thicknes should not be excessive, as the wall thickness of bottom left hinge lug 14 ordinarily will be reduced as the wall thickness of independent support sleeve 19 is increased.

Figure 4:
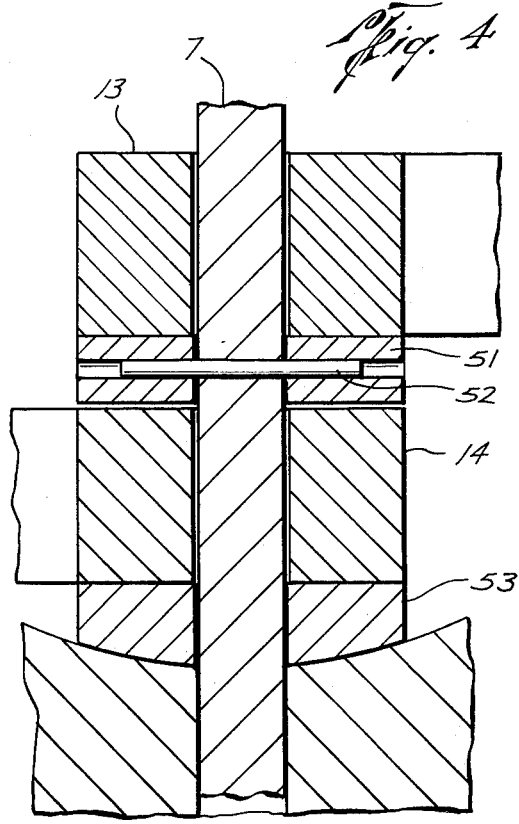
FIG. 4 is a detail drawing of the longitudinal section of an alternative independent plate suspension means.

A variation of the above described suspension system is illustrated in FIG. 4. The hinge pin 7 is inserted through a one-piece collar 51 between bottom right hinge lug 13 and bottom left hinge lug 14 (additional bearings may be inserted if desired). One or more drive pins 52 are laterally inserted into the collar 51 and through the hinge pin 7 to hold the collar 51 in place. Collar 51 then provides a support surface for bottom right hinge lug 13, and the weight of the upper plate is then supported by collar 51, hinge pin 7, and the body 1. Beveled bottom lug bearing 53 supports bottom left hinge lug 14, and the hinge pin 7 is supported by a hinge pin retainer 41 or other appropriate means.

Although the collar 51 is shown to be attached to the hinge pin 7 by a drive pin 52, any method of securely anchoring the collar 51 such that it will support the weight of the upper plate may be used. A different method is shown in FIG. 5, in which a two-piece collar 55 is clamped around a portion of the hinge pin 7 with a reduced diameter, and secured with two collar bolt 56. the bottom right hinge lug 13 is then supported by the collar 55.

Figure 5:
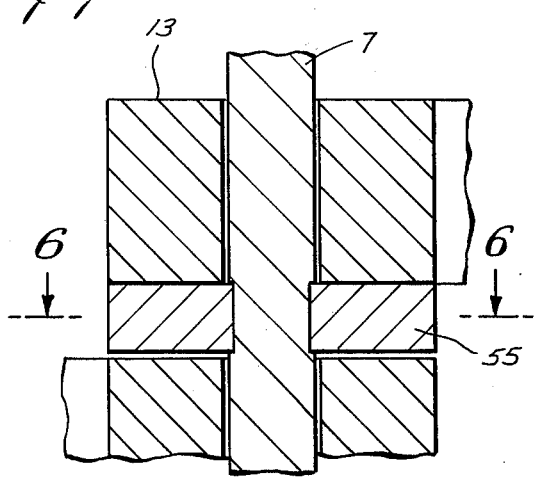
FIG. 5 is a detail drawing of the longitudinal section of yet another independent plate suspension means within the scope of this invention.
Figure 6:
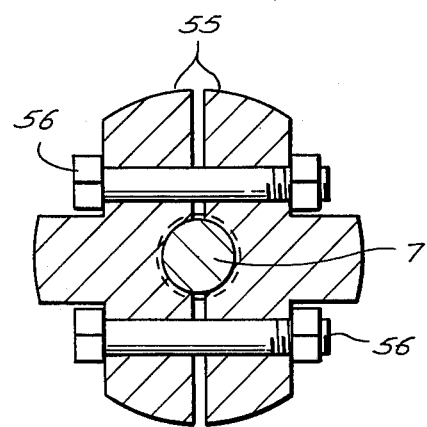
FIG. 6 is a sectional view of the collar shown in FIG. 5 taken along the line 6—6.

The collar types of suspension shown in FIGS. 4 and 5 do not result in a loss of wall thickness of the bottom left hinge lug 14, as is the case of the support sleeve type supension shown in FIG. 3. However, the support sleeve type suspension does not require anchoring to the hinge pin as the collar type suspension does.

A collar type suspension could be used to "hang" the upper plate from its top hinge lug, rather than from the bottom hing lug as is shown. Also, a support bracket could be anchored to the body 1 or other appropriate place to provide a support surface for the upper hinge.

It may be desirable to make the top and bottom of the valve identical (symmetrical about the horizontal plane). While some additional parts would then be required to provide a duplicate suspension at the top of the valve as that found at the bottom, and the upper suspension would not provide any necessary support function, such a duplicate suspension would allow the valve to be installed without regard for top or bottom so long as the hinge pin is in a vertical position. This would prevent accidental installation of the valve upside-down, which would impair valve function.

Thus, the novel independent suspension has both reduced the number of surfaces at which significant friction occurs and reduced the frictional force acting upon one of the surfaces. The upper surface of bottom left hinge lug 14 is no longer in contact with the hinge lug above it, thereby eliminating significant frictional force acting on that surface. Since bottom left hinge lug 14 no longer supports the hinge lug above it or the weight of the right plate associated with the upper hinge lug, the frictional force acting on the lower surface of bottom left hinge lug 14 is greatly reduced. Depending upon the physical characteristics of the surfaces involved, the amount of frictional force acting on bottom left hinge lug 14 in this novel design can be reduced to one-third of the frictional force associated with a conventional design. Additionally, this novel design makes the frictional forces acting upon the two plates nearly equal.

I claim:

1. An improved valve of the type having a body with a fluid flow conduit therethrough, a valve seat surrounding said flow conduit, valve members for sealing said fluid flow conduit, a shaft for pivotally supporting said valve members within said body, and separate hinges for mounting said valve members on said shaft, wherein the improvement comprises means for supporting said valve members and hinges independently, including support means attached to or resting upon said body and providing a support surface interposed between two of said hinges, said support means supporting the upper hinge of said two hinges.

2. The improved valve of claim 1 in which the support means is a bracket attached to said body, a portion of said bracket being interposed between two hinges associated with separate valve members, said portion supporting the upper hinge of said two hinges.

3. An improved valve of the type having a body with a fluid flow conduit therethrough, a valve seat surrounding said flow conduit, valve members for sealing said fluid flow conduit, a shaft for pivotally supporting said valve members within said body, and separate hinges for mounting said valve members on said shaft, wherein the improvement comprises a support sleeve encircling a portion of said shaft and resting upon said body or upon bearings resting upon said body, said sleeve providing a surface interposed between a hinge attached to one of said valve members and another hinge attached to a different valve member, said sleeve separating said hinges and providing support for the upper hinge of said two hinges.

4. An improved valve of the type having a body with a fluid flow conduit therethrough, a valve seat surrounding said flow conduit, valve members for sealing said fluid flow conduit, a shaft for pivotally supporting said valve members within said body, and separate hinges for mounting said valve members on said shaft, wherein the improvement comprises a support collar attached to said shaft and interposed between two of said hinges supporting separate valve members whereby said collar supports the upper hinge of said two hinges.

* * * * *